United States Patent
Mogul et al.

(10) Patent No.: US 9,590,909 B2
(45) Date of Patent: Mar. 7, 2017

(54) REDUCING TCP TIMEOUTS DUE TO INCAST COLLAPSE AT A NETWORK SWITCH

(75) Inventors: Jeffrey Clifford Mogul, Menlo Park, CA (US); Paul T Congdon, Granite Bay, CA (US); Jayaram Mudigonda, Los Altos, CA (US); Lucian Popa, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 57 days.

(21) Appl. No.: 14/355,288

(22) PCT Filed: Oct. 31, 2011

(86) PCT No.: PCT/US2011/058648
§ 371 (c)(1),
(2), (4) Date: Apr. 30, 2014

(87) PCT Pub. No.: WO2013/066301
PCT Pub. Date: May 10, 2013

(65) Prior Publication Data
US 2014/0247718 A1    Sep. 4, 2014

(51) Int. Cl.
*H04L 12/801* (2013.01)
*H04L 12/861* (2013.01)
(Continued)

(52) U.S. Cl.
CPC .............. *H04L 47/12* (2013.01); *H04L 47/32* (2013.01); *H04L 49/9084* (2013.01); *H04L 69/163* (2013.01)

(58) Field of Classification Search
CPC ........................... H04L 49/9084; H04L 47/12
See application file for complete search history.

(56) References Cited

U.S. PATENT DOCUMENTS 6,608,813 B1     8/2003  Chiussi et al.
7,760,636 B1 *   7/2010  Cheriton ............... H04L 1/1874
                                                    370/230
(Continued)

FOREIGN PATENT DOCUMENTS

CN    1345499 A     4/2002
CN    101414957 A   4/2009
(Continued)

OTHER PUBLICATIONS

Brad Hedlund, "TCP Ineast and Cloud application performance", May 1, 2011, Online http://bradhedlund.com/2011/05/01/tcp-incast-and-cloud-application-performance/.*
Mohammad Alizadeh et al., "DCTCP: Efficient Packet Transport for the Commoditized Data Center", Jan. 2010, ACM SIGCOMM.*
Prajjwal Devkota et al., "Performance of Quantized Congestion Notification in TCP Incast Scenarios of Data Centers", 2010 18th Annual IEEE/ACM International Symposium on Modeling, Analysis and Simulation of Computer and Telecommunication Systems.*
(Continued)

*Primary Examiner* — Chi H Pham
*Assistant Examiner* — Kevin Lee
(74) *Attorney, Agent, or Firm* — Hewlett Packard Enterprise Patent Department (57) ABSTRACT

A network switch for reducing TCP timeouts due to incast collapse is disclosed. The network switch has a plurality of buffers for storing network packets for at least one sender server. An incast buffer management component in the network switch allocates a buffer in the plurality of buffers to store an incast notification packet, the incast notification packet indicating one or more network packets that have been dropped by the network switch. The network switch also includes an incast notification component for forwarding the incast notification packet to a destination server with an incast notification packet specific header.

16 Claims, 7 Drawing Sheets

(51) Int. Cl.
*H04L 12/823* (2013.01)
*H04L 29/06* (2006.01)

(56) References Cited

U.S. PATENT DOCUMENTS

| | | | |
|---|---|---|---|
| 8,547,846 B1* | 10/2013 | Ma | H04L 47/12 370/235 |
| 2006/0193261 A1 | 8/2006 | Sethi | |
| 2008/0019274 A1 | 1/2008 | Droux et al. | |
| 2010/0014419 A1 | 1/2010 | Lee et al. | |
| 2010/0226384 A1 | 9/2010 | Prabhakar et al. | |
| 2011/0078532 A1 | 3/2011 | Vonog et al. | |
| 2013/0215750 A1* | 8/2013 | Beecroft | H04L 47/11 370/235 |

FOREIGN PATENT DOCUMENTS

| | | |
|---|---|---|
| CN | 101711468 A | 5/2010 |
| WO | WO-99/00939 A1 | 1/1999 |

OTHER PUBLICATIONS

A. Sathiaseelan and T. Radzik, "Reorder Notifying TCP (RN-TCP) with Explicit Packet Drop Notification (EPDN)," International Journal of Communication Systems, vol. 19, No. 6, Aug. 1, 2006 (Aug. 1, 2006), pp. 659-678.

Extended European Search Report, EP Application No. 11874903.5, Date: Aug. 25, 2015, pp. 1-19.

H. Balakrishnan and R.H. Katz et al., Explicit Loss Notification and Wireless Web Performance, IEEE Globecom Internet Mini-Conference, Sydney, Australia, Nov. 1998, pp. 1-12.

Haitao Wu "ICTCP: Incast Congestion Control for TCP in Data Center Networks" Copyright 2010 ACM 1-4503-0448—Jan. 10, 2011, 12 pages.

International Search Report and Written Opinion received in PCT Application No. PCT/US2011/058648, mailed Jul. 2, 2012, pp. 9.

Vasudevan; "Safe and Effective Fine-grained TCP Retransmissions for Datacenter Communication" Copyright 2009 ACM 978-1-60558-594—Sep. 9, 2008, 12 pages.

* cited by examiner

REDUCING TCP TIMEOUTS DUE TO INCAST COLLAPSE AT A NETWORK SWITCH

BACKGROUND

Large scale and cloud datacenters are becoming increasingly popular. Small, medium, and large businesses alike are turning to these datacenters for their data storage needs, computational tasks, applications and IT jobs. This helps them eliminate the expensive, and often very complex, task of building and maintaining their own infrastructure. A datacenter is typically architected with numerous interconnected storage devices, switches, and servers that may be shared across multiple users. Users access the datacenter over wide area networks that rely on IP-based protocols to transmit their data back and forth. As datacenters grow, so does the number of packets delivered across the networks and the need to keep their transmission reliable while maintaining application throughput.

A common problem affecting datacenter networks is packet loss and reduced application throughput due to incast collapse. Incast collapse occurs when multiple servers simultaneously send data to a destination server such that the number of packets sent is larger than the available buffer space at the network switch to which the destination server is connected. The highly bursty traffic of multiple and simultaneously arriving packets overflow the switch buffers in as short period of time causing intense packet losses and thus leading to timeouts. Incast collapse tends to afflict applications (e.g., search, data storage, etc.) that follow a "partition-aggregate" model: a single server ("S") processing a request sends sub-requests to a large number ("N") of other servers in parallel ("partition"), then waits for their answers before giving it's own response ("aggregate").

The incast collapse problem arises because the answers being aggregated are sent as network packets by all N servers at about the same time, i.e., they are "synchronized". The server S is connected to the datacenter network via an edge switch "E", and so these N packets (or more generally, N*M, usually for some small value of M) all arrive at E at the same time. As most datacenter networks employ inexpensive edge switches with relatively limited buffering due to cost reasons, the number of simultaneously arriving packets for S may be larger than the available buffer space at E. The result is that some packets are dropped, which can lead to excessive TCP timeouts thereby causing serious violations of throughput and latency targets for these applications.

Since datacenter applications usually rely on TCP to provide reliable, congestion-controlled transport, the effect of a packet loss is that TCP must retransmit the lost packet. In many circumstances, TCP relies on timeouts to resend lost packets; traditional TCP timeouts are no shorter than a few hundred msec. These timeouts therefore create large application-level latencies and reduced application throughput. With datacenters often requiring overall application response times of a few hundred milliseconds for 99.99% or more of the requests, packet loss due to incast collapse can therefore have a significant impact on datacenter network performance.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

A network switch, method and non-transitory computer readable medium for reducing TCP timeouts due to incast collapse are disclosed. As generally described herein, incast collapse refers to the detrimental effect on network performance that occurs when multiple servers simultaneously send data to a destination server such that the number of packets sent is larger than the available buffer space at the network switch to which the destination server is connected. The network switch then drops one or more packets, resulting in TCP timeouts.

In various embodiments, a network switch is equipped to detect incast collapse with an incast buffer management component and notify a destination server of incast collapse packet loss with an incast notification component. The network switch may be, for example, an edge switch in a datacenter directly attached to the destination server. The incast buffer management component allocates a buffer to store a specially designated incast notification packet ("INP") that indicates that one or more packets were dropped. As generally described herein, an INP packet is a packet that holds the packet headers (but not the payloads) of the packet(s) that were dropped, e.g., their Ethernet/IP/TCP headers.

The incast notification component forwards the INP packet to the destination server with a special INP packet header so that the destination server knows it is receiving an INP packet rather than a regular packet. Because the INP packet contains the headers of the packet(s) that were destined for the destination server but were dropped by the network switch, the destination server networking stack knows that these packets must be retransmitted by the sender(s). These INP packet notifications can be carried out by any appropriate link-level protocol. The destination server can inform the network switch via as separate protocol, such as LLDP, that it is willing to accept INPs. Additionally, the destination server can inform the sender server(s) that packet(s) have been lost using several possible mechanisms.

It is appreciated that embodiments described herein below may include various components and features. Some of the components and features may be removed and/or modified without departing from a scope of the network switch, method and non-transitory computer readable medium for reducing TCP timeouts due to incast collapse. It is also appreciated that, in the following description, numerous specific details are set forth to provide a thorough understanding of the embodiments. However, it is appreciated that the embodiments may be practiced without limitation to these specific details. In other instances, well known methods and structures may not be described in detail to avoid unnecessarily obscuring the description of the embodiments. Also, the embodiments may be used in combination with each other.

Reference in the specification to "an embodiment," "an example" or similar language means that a particular feature, structure, or characteristic described in connection with the embodiment or example is included in at least that one example, but not necessarily in other examples. The various instances of the phrase "in one embodiment" or similar phrases in various places in the specification are not necessarily all referring to the same embodiment. As used herein, a component (e.g., incast buffer management component, incast notification component) is a combination of hardware and software executing on that hardware to provide the defined functionality.

Figure 1:
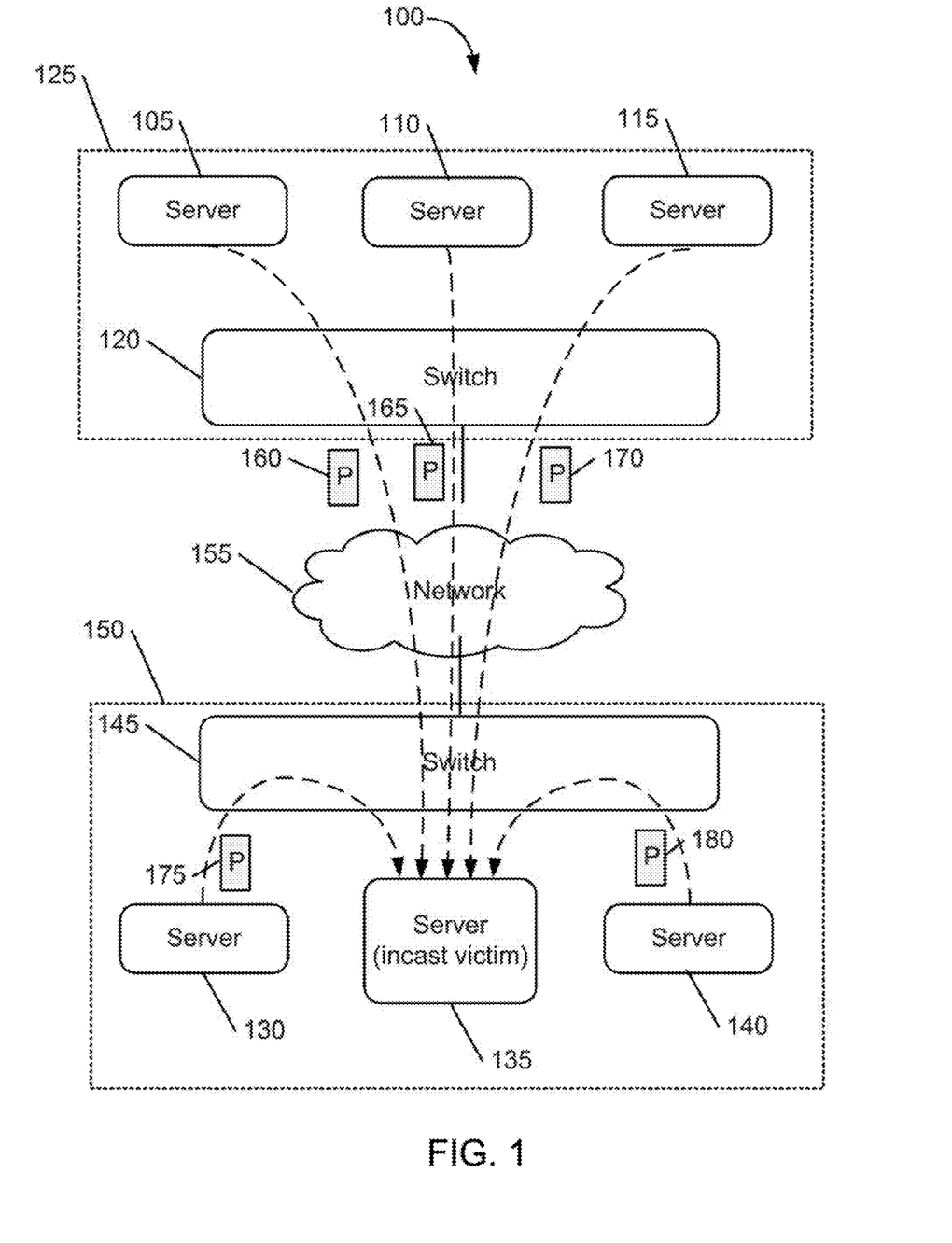
FIG. 1 is a schematic diagram illustrating a network in which the embodiments may be implemented.

Referring now to FIG. 1, a schematic diagram illustrating a network in which the embodiments may be implemented is described. Network 100 provides network access to servers in one or more datacenters. Each datacenter has multiple storage devices, servers, and switches. For example, the switches 120 and 145 are the access switches of servers 105-115 and 130-140, respectively. The network 155 may represent the rest of a datacenter network fabric or the network between two datacenters in case servers 105-115 and servers 130-140 are located in different datacenters (e.g., servers 105-115 in as datacenter 125 and servers 130-140 in a datacenter 150).

Servers 105-115 and servers 130-140 communicate to each other using IP packets that are routed through switches 120 and 145. Once the packets arrive at the switches 120 and 145, they are temporarily placed into buffers until they are ready to be delivered to their destination. As appreciated by one skilled in the art, incast collapse occurs when multiple servers simultaneously send packets to a destination server such that the number of packets sent is larger than the available buffer space at the network switch to which the destination server is connected. For example, if servers 105-115 and servers 130 and 140 simultaneously send packets 160-180 to destination server 135, packets 160-180 going through switch 145 may find that the buffer space in switch 145 is already full. In this case, the switch 145 may be forced to drop the packets 160-180 and they will have to be transmitted.

Figure 2:
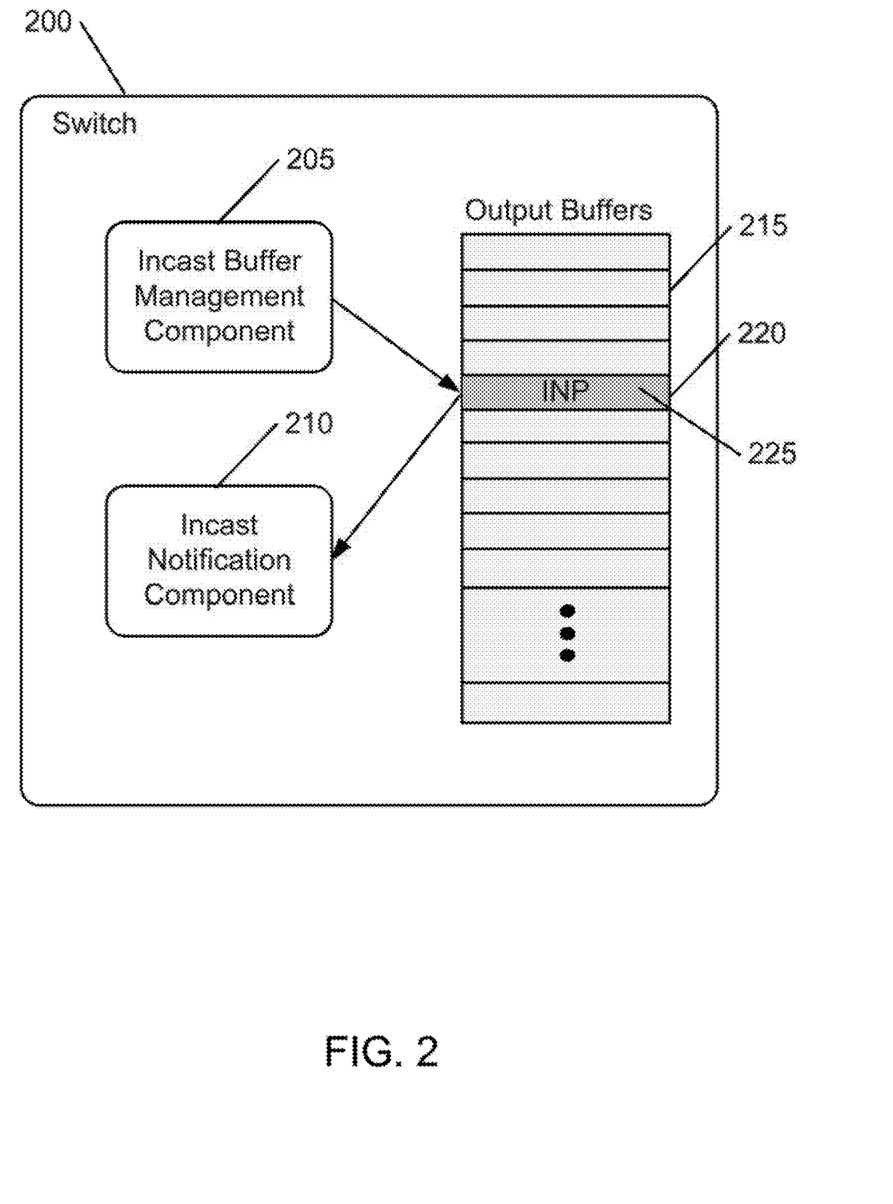
FIG. 2 is a schematic diagram illustrating how a network switch handles incast collapse in accordance to various embodiments.

Attention is now directed to FIG. 2, which illustrates how a network switch (e.g., switch 145) handles incast collapse and decides what to do with incoming packets (e.g., packets 160-180) when its buffers are full. Network switch 200 has an incast buffer management component 205 to detect packet loss and an incast notification component 210 to notify a destination server (e.g., server 135) of packet loss due to incast collapse. The network switch 200 may be, for example, an edge switch (e.g., switch 145) directly connected to the destination server (e.g., server 135) in a datacenter (e.g., datacenter 150). Packets arriving at the network switch 200 are temporarily stored in a finite array of output buffers 215.

When the output buffers 215 are full (or all of the output buffers allocated to a particular output port are full) and cannot accommodate any additional incoming packet(s), the incast but management component 205 may drop the incoming packet(s) and allocate a buffer to store a specially designated incast notification packet ("INP"). The buffer allocated may be a currently used buffer (in which case the packet stored in the buffer is also dropped) or an output buffer specifically reserved to store INP packets. In the first case, the incast buffer management component 205 may select one of the currently buffered packets to drop and free the output buffer occupied by that packet using, for example, a probabilistic packet dropping algorithm that drops a packet based on the current occupancy of the output buffers 215 and some chosen parameters (e.g., the Random Early Detection ("RED") algorithm). The parameters may include, for example, the length of the selected packet and the length of the incoming packet.

The incast buffer management component 205 may then use the newly free buffer space (e.g., buffer 220) to store an INP packet (e.g., INP packet 225) to indicate the one or more packets that were dropped. The INP packet 225 may be a packet having a specially designated INP header and a specially designated payload that holds the packet headers of the packet(s) that were dropped (but not their payloads), e.g., their Ethernet/IP/TCP headers.

The incast notification component 210 inserts the specially designated INP header in the INP packet 225 and forwards the INP packet 225 to the destination server (e.g., server 135). The special INP header indicates to the destination server that it is receiving an INP packet rather than a regular packet. Because the INP packet 225 contains the headers of the packet(s) that were dropped by the network switch 200, the destination server networking stack knows which packets must be retransmitted by the sender(s). These INP packet notifications can be carried out by any appropriate link-level protocol. The destination server can inform the network switch 200 via a protocol, such as LLDP, that is willing to accept INPs. Additionally, the destination server can inform the sender(s) (e.g., servers 105-115 and servers 130 and 140) that packets have been lost using several possible mechanisms.

According to various embodiments, the incast notification component 210 may wait until the INP packet 225 is at the head of the output buffer queue to forward the INP packet 225 to the destination server. Alternatively, the incast notification component 210 may place the INP packet 225 at the head of the output buffer queue as soon as the INP packet 225 is created and send it out to the destination server. The incast notification component 210 can also control the decision to forward the INP packet 225 so as to ensure that the INP traffic does not starve the rest of the queue and that the destination server still receives an adequate rate of regular (i.e., non-INP) traffic.

Figure 3A:
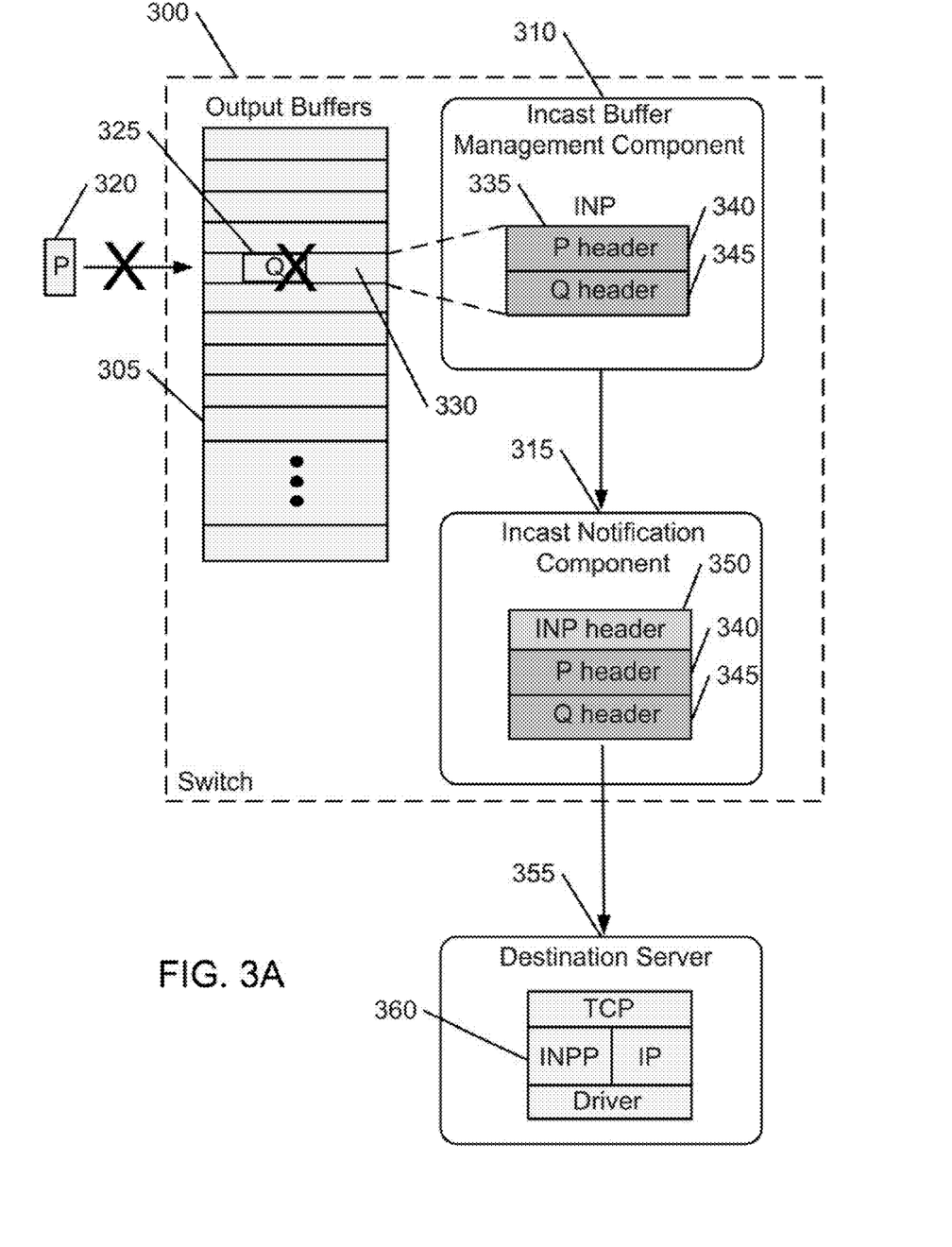
FIG. 3A is a schematic diagram illustrating the operations performed by the incast buffer management component and the incast notification component of FIG. 2 in more detail.
Figure 3B:
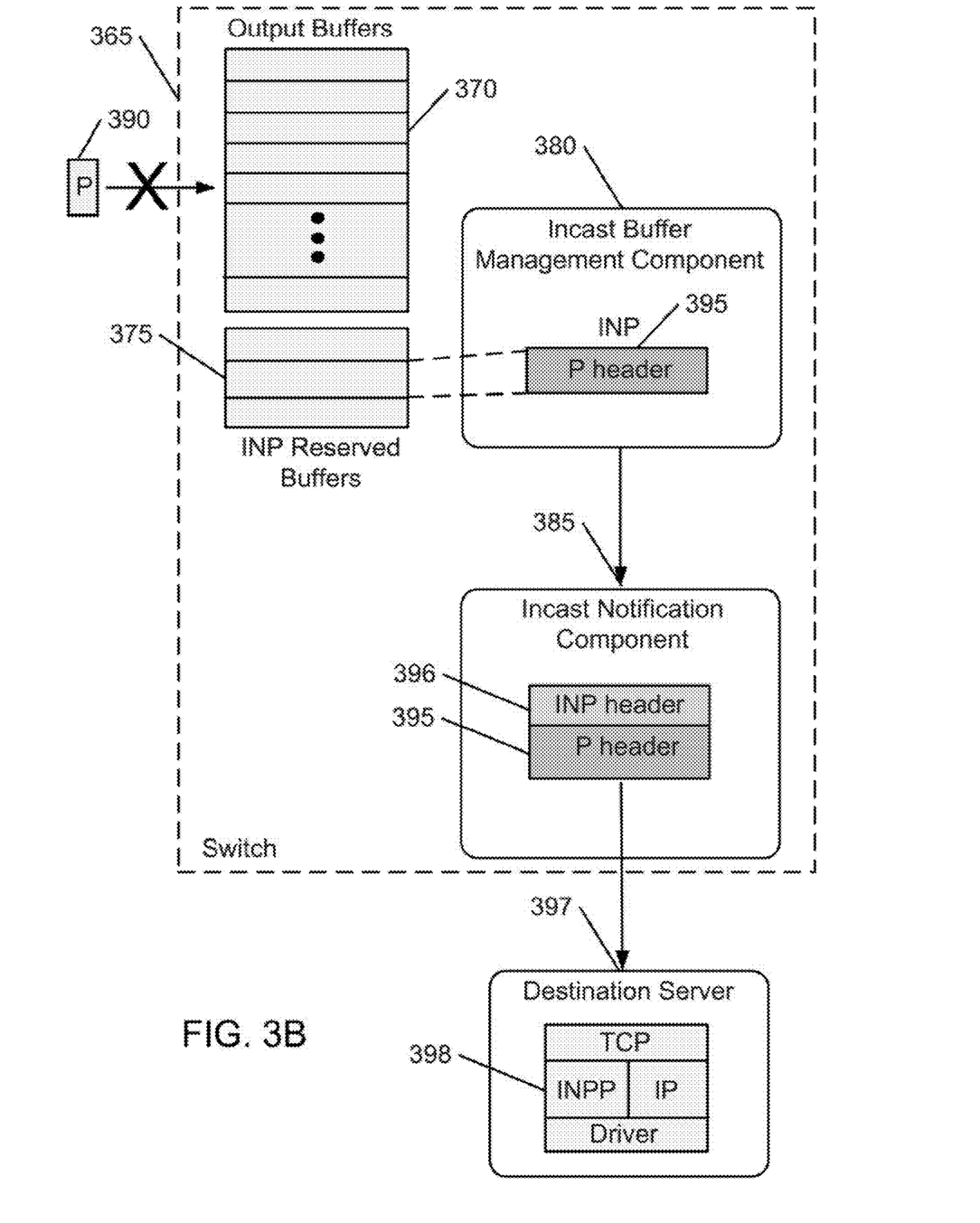
FIG. 3B is another schematic diagram illustrating the operations performed by the incast buffer management component and the incast notification component of FIG. 2 in more detail.

Referring now to FIGS. 3A-B, schematic diagrams illustrating the operations performed by the incast buffer management component 205 and the incast notification component 210 in more detail are described. FIG. 3A shows a switch 300 having a set of output buffers 305, an incast buffer management component 310 and an incast notification component 315. When a packet P 320 arrives at the switch 300 and all its output buffers 305 are full, the incast buffer management component 310 selects one of the currently buffered packets Q 325 in output buffer 330 to drop.

The output buffer 330 is converted to store an INP packet 335 indicating that packets P 320 and Q 325 were dropped. The NP packet 335 in output buffer 330 holds the packet headers 340-345 of the packets P 320 and Q 325.

The incast notification component 315 inserts a specially designated. INP header 350 in INP packet 335 and forwards it to the destination server 355. As described above, the incast notification component 315 may wait until the INP packet 335 is at the head of the output buffer queue to forward it to the destination server 355, it may place the INP packet 335 at the head of the output buffer queue as soon as the INP packet 335 is created and send it out to the destination server 355, or forward the INP packet 335 in a way that ensures an adequate and desired rate of incoming packets, while ensuring that the INP traffic does not starve the rest of the queue and an adequate rate of non-INP traffic is forwarded to the destination server. The INP packet 335 may be forwarded to the destination server 355 to the destination server 355 using a link-level protocol, such as, for example, a new protocol designated herein as "INPP" for INP Protocol 360. This INPP protocol 360 is also implemented at the networking stack of the destination server 355. As appreciated by one skilled in the art, the INPP protocol 360 may be placed between the IF layer and the driver layer, or parallel to the IP layer as shown in FIGS. 3A-B.

As appreciated by one skilled in the art, the destination server 355 must inform the sender(s) of the dropped packets P 320 and Q 325 that the packets were dropped. There are several possible mechanisms for this, including, for example, using TCP's Selective Acknowledgement ("SACK") option to inform the sender(s) (within roughly one Round-Trip Time ("RTT")) that the packets P 320 and Q 325 were dropped due to incast collapse, without the need to rely on any timeout mechanism. As an alternate embodiment, the TCP protocol could be extended to support an explicit Negative Acknowledgement ("NACK") option, or another TCP suitable option. The sender(s) may still employ techniques to reduce its sending rate in response to the dropped packets. In practice, since there is an upper limit to the number of INP packets that a switch can buffer, the sender(s) might need to employ a backstop mechanism (such as, for example, fine-grained TCP timeouts) to more fully protect against incast collapse or use 802.3 flow control (pause or per-priority pause frames) to stop the flow of packets.

Attention is now directed to FIG. 3B, which shows a network switch 365 having a set of output buffers 370, a set of reserved INP buffers 375, an incast buffer management component 380 and an incast notification component 385. In this case, when a packet P 390 arrives at the switch 365 and all its output buffers 370 are full, the packet P 390 is dropped and the incast buffer management component 380 allocates one of the reserved buffers 375 to store an INP packet 395 holding the packet headers of packet P 390. The incast notification component 385 then inserts a specially designated. INP header 396 into the INP packet 395 and forwards the INP packet 395 to its destination server 397 in a manner similar to that as described above with reference to FIG. 3A.

It is appreciated that, because an INP packet just holds the packet headers of the packet(s) that are dropped, the INP packet has space to hold multiple packet headers. If an INP packet is filled up and another unbufferable packet arrives, the network switch (e.g., switches 300 and 365) may allocate another buffer for another INP (by converting, a currently buffered entry in switch 300 or using, another reserved INP buffer in switch 365), possibly until all such buffers are INPs, at which point new packets may have to be dropped silently or backpressure techniques such as 802.3 flow control may have to be applied. It is also appreciated that, although shown in FIGS. 3A-13 as just holding the packet headers of the packet(s) that are dropped, an INP packet may also have additional fields. For example, an INP packet may have a field (e.g., a one byte field indicating the length of the subsequent headers) in between each set of packet headers to serve as a separation between these sets. One skilled in the art appreciates that there are various ways to design an INP packet.

Figure 4:
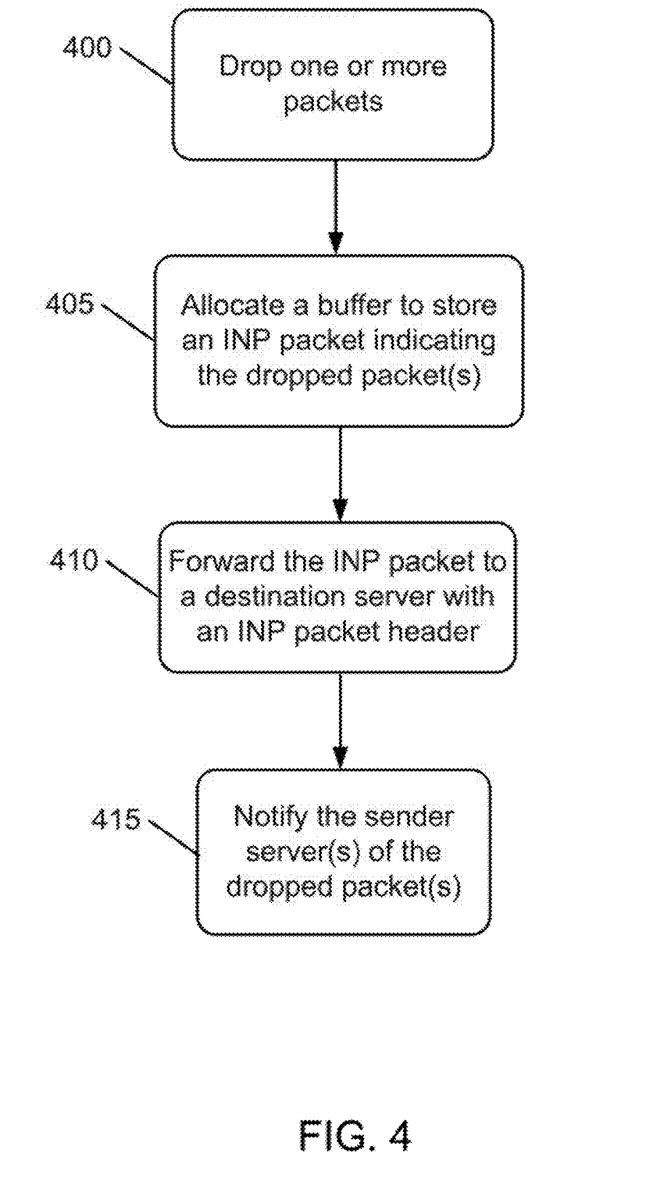
FIG. 4 is a flowchart for reducing TCP timeouts due to incast collapse in a network switch.

Referring now to FIG. 4, a flowchart for reducing TCP timeouts due to incast collapse implemented in a network switch is described. First, one or more incoming packets are dropped if there is no space in the switch's buffers to hold the packets (400). Next, the switch (more specifically, the incast buffer management component in the switch) allocates a buffer to store an INP packet indicating the dropped packets (405). As described above, the buffer allocated may be a newly free buffer space after dropping a buffered packet (as shown in FIG. 3A) or a reserved INP buffer space as shown in FIG. 3B). After the buffer is allocated, the incast notification component forwards the NP packet with an INP header to a destination server (410). Lastly, the destination server notifies the sender server(s) of the packet(s) that were dropped by using, for example, TCP's NACKs or another TCP suitable option (415).

Figure 5A:
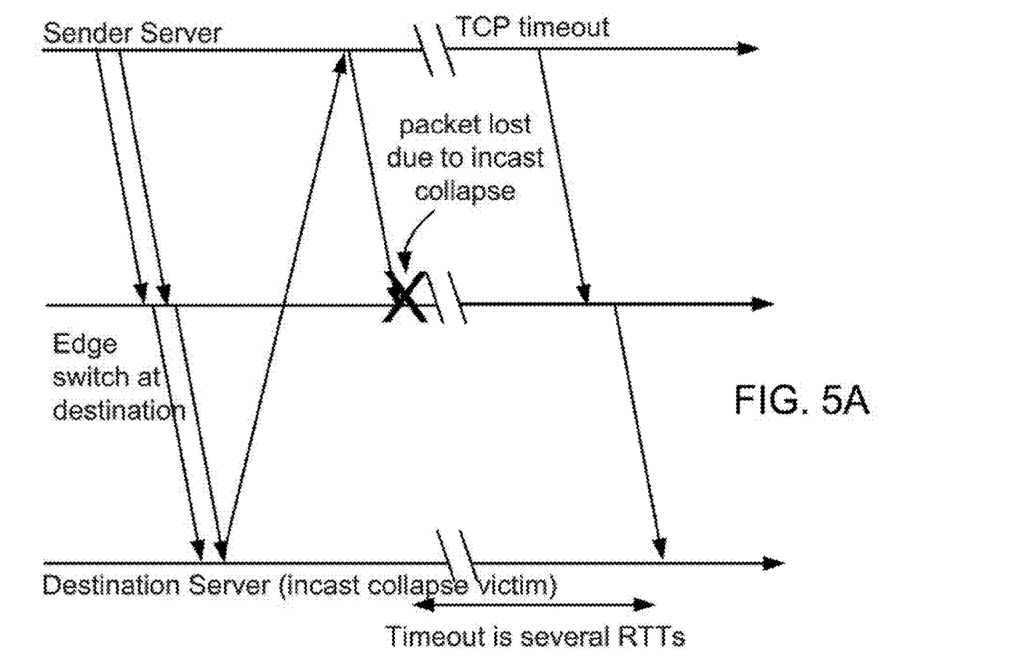
FIG. 5A is a timeline for a packet going through a network switch experiencing incast collapse.
Figure 5B:
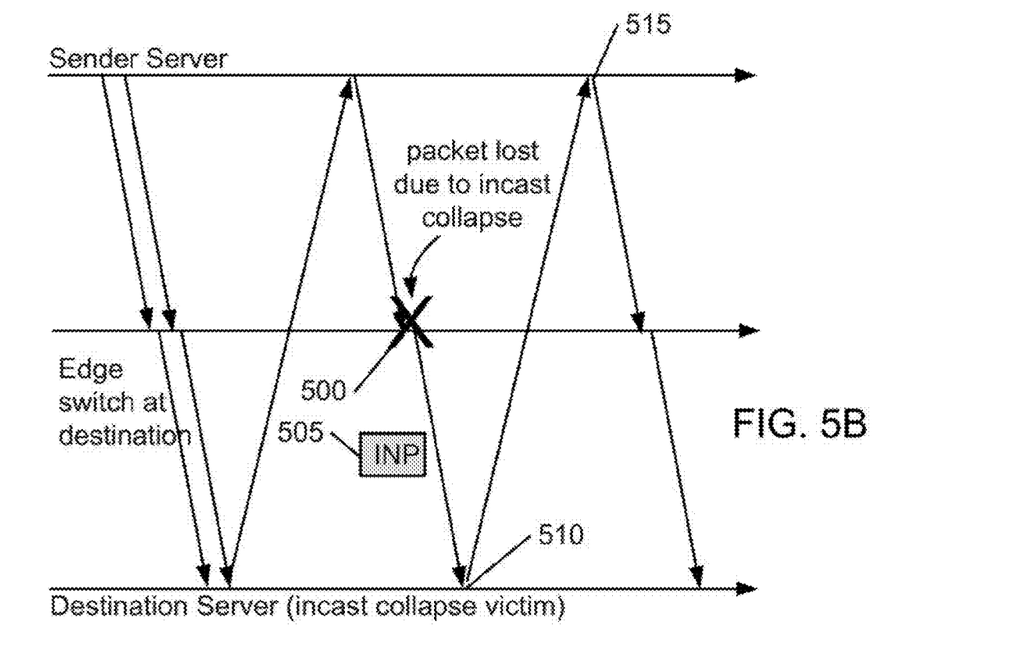
FIG. 5B is a timeline for a packet going through a network switch that uses INP packets to reduce TCP timeouts due to incast collapse.

Advantageously, using INP packets to reduce the impact of incast collapse results in the sender retransmitting packet without having to wait for a timeout, as illustrated in FIG. 5B. FIG. 5B shows a packet timeline going through a network switch experiencing incast collapse. The network switch has an incast buffer management component and an incast notification component to reduce the impact of incast collapse with the use of INP packets, as described above. When the packet is dropped because of a lack of buffer space (500), an INP packet 505 is sent to the destination server and the destination server then notifies the sender of the packet loss (510). The sender then retransmits the packet (515) without having to wait for a timeout. Contrast this with FIG. 5A, in which a network switch that does not rely on INP packets to reduce incast collapse packet loss has to wait for at least several RTTs before retransmitting the dropped packet(s).

Figure 6:
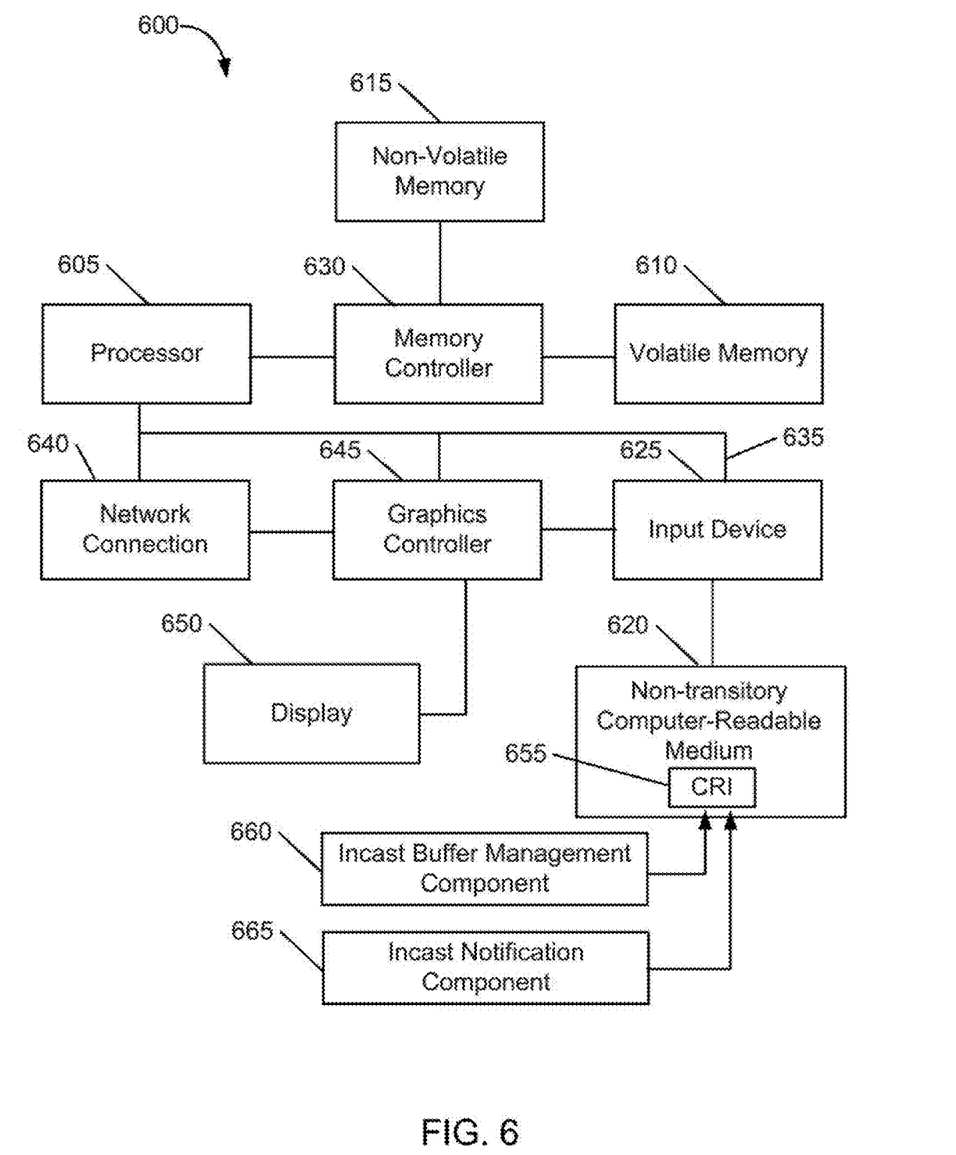
FIG. 6 is a block diagram of an example computing system for hosting the incast buffer management component and the incast notification component of FIG. 2 according to the present disclosure.

As described above, the incast buffer management component and the incast notification component used by a network switch to reduce TCP timeouts due to incast collapse may be implemented in hardware, software, or a combination of both. Referring now to FIG. 6, a computing system for hosting the incast but management component and the incast notification component of FIG. 2 according to the present disclosure is described. The computing system 600 (e.g., a network switch) can include a processor 605 and memory resources, such as, for example, the volatile memory 610 and/or the non-volatile memory 615, for executing instructions stored in a tangible non-transitory medium (e.g., volatile memory 610, non-volatile memory 615, and/or computer readable medium 620) and/or an application specific integrated circuit ("ASIC") including logic configured to perform various examples of the present disclosure.

A machine (e.g., a computing device) can include and/or receive a tangible non-transitory computer-readable medium 620 storing a set of computer-readable instructions (e.g., software) via an input device 625. As used herein, the processor 605 can include one or a plurality of processors such as in a parallel processing system. The memory can include memory addressable by the processor 605 for execution of computer readable instructions. The computer readable medium 620 can include volatile and/or non-volatile memory such as a random access memory ("RAM"), magnetic memory such as a hard disk, floppy disk, and/or tape memory, a solid state drive ("SSD"), flash memory, phase change memory, and so on. In some embodiments, the non-volatile memory 615 can be a local or remote database including a plurality of physical non-volatile memory devices.

The processor 605 can control the overall operation of the computing system 600. The processor 605 can be connected to a memory controller 630, which can read and/or write data from and/or to volatile memory 610 (e.g., RAM). The memory controller 630 can include an ASIC and/or a processor with its own memory resources (e.g., volatile and/or non-volatile memory). The volatile memory 610 can include one or a plurality of memory modules (e.g., chips). The processor 605 can be connected to a bus 635 to provide communication between the processor 605, the network connection 640, and other portions of the computing system 600. The non-volatile memory 615 can provide persistent data storage for the computing system 600. Further, the graphics controller 645 can connect to an optional display 650.

Each computing system 600 can include a computing device including control circuitry such as a processor, a state machine, ASIC, controller, and/or similar machine. As used herein, the indefinite articles "a" and/or "an" can indicate one or more than one of the named object. Thus, for example, "a processor" can include one or more than one processor, such as in a parallel processing arrangement.

The control circuitry can have a structure that provides a given functionality, and/or execute computer-readable instructions that are stored on a non-transitory computer-readable medium (e.g., the non-transitory computer-readable medium 620). The non-transitory computer-readable medium 620 can be integral, or communicatively coupled, to a computing device, in either a wired or wireless manner. For example, the non-transitory computer-readable medium 620 can be an internal memory, a portable memory, a portable disk, or a memory located internal to another computing resource (e.g., enabling the computer-readable instructions to be downloaded over the Internet).

The non-transitory computer-readable medium 620 can have computer-readable instructions 655 stored thereon that are executed by the processor 605 to implement an incast buffer management component 660 and an incast notification component 665 according to the present disclosure. The non-transitory computer-readable medium 620, as used herein, can include volatile and/or non-volatile memory. Volatile memory can include memory that depends upon power to store information, such as various types of dynamic random access memory ("DRAM"), among others. Non-volatile memory can include memory that does not depend upon power to store information. Examples of non-volatile memory can include solid state media such as flash memory, EEPROM, and phase change random access memory ("PCRAM"), among, others. The non-transitory computer-readable medium 620 can include optical discs, digital video discs ("DVD"), Blu-Ray Discs, compact discs ("CD"), laser discs, and magnetic media such as tape drives, floppy discs, and hard drives, solid state media such as flash memory, EEPROM, PCRAM, as well as any other type of computer-readable media.

It is appreciated that the previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein. For example, it is appreciated that the present disclosure is not limited to a particular configuration, such as computing system 600.

Those of skill in the art would further appreciate that the various illustrative modules and steps described in connection with the embodiments disclosed herein may be implemented as electronic hardware, computer software, or combinations of both. For example, the example steps of FIG. 4 may be implemented using software modules, hardware modules or components, or a combination of software and hardware modules or components. Thus, in one embodiment, one or more of the example steps of FIG. 4 may comprise hardware modules or components. In another embodiment, one or more of the steps of FIG. 4 may comprise software code stored on a computer readable storage medium, which is executable by a processor.

To clearly illustrate this interchangeability of hardware and software, various illustrative components, blocks, modules, and steps have been described above generally in terms of their functionality (e.g., the incast buffer management component 660 and the incast notification component 665). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A network switch for reducing TCP timeouts due to incast collapse, comprising:
    a plurality of buffers to store network packets for at least one sender server, wherein the plurality of buffers comprises a plurality of reserved incast notification packet buffers;
    an incast buffer management component to allocate a buffer in the plurality of buffers to store an incast notification packet, the incast notification packet indicating one or more network packets that have been dropped by the network switch, and wherein the buffer allocated in the plurality of buffers comprises a currently used buffer, the currently used buffer storing a packet that is selected to be dropped by the network switch; and
    an incast notification component to forward the incast notification packet to a destination server with an incast notification packet specific header.

2. The network switch of claim 1, wherein the buffer allocated in the plurality of buffers comprises a reserved incast notification packet buffer.

3. The network switch of claim 1, wherein the incast notification packet comprises one or more packet headers for the one of more network packets that have been dropped by the network switch.

4. The network switch of claim 1, wherein the incast notification component forwards the incast notification packet to a destination server using a link-level protocol.

5. A method for reducing TCP timeouts due to incast collapse in a large scale datacenter, comprising:

dropping one or more network packets sent by one or more sender servers to a network switch having a plurality of buffers, the one or more packets dropped by the network switch when the plurality of buffers is full, and wherein the plurality of buffers comprises a plurality of reserved incast notification packet buffers;

allocating a buffer in the plurality of buffers to store an incast notification packet, the incast notification packet indicating the one or more network packets that have been dropped by the network switch, wherein the buffer allocated in the plurality of buffers comprises a currently used buffer, the currently used buffer storing a packet that is selected to be dropped by the network switch;

forwarding the incast notification packet to a destination server with an incast notification packet specific header; and notifying the one or more sender servers that the one or more packets have been dropped.

6. The method of claim 5, wherein the buffer allocated in the plurality of buffers comprises a reserved incast notification packet buffer.

7. The method of claim 5, wherein the incast notification packet comprises one or more packet headers for the one of more network packets that have been dropped by the network switch.

8. The method of claim 7, wherein the incast notification packet comprises a field in between each of the one or more packet headers.

9. The method of claim 5, wherein forwarding the incast notification packet to a destination server comprises waiting until the incast notification packet is at the head of an output buffer queue in the network switch to forward the incast notification packet to the destination server.

10. The method of claim 5, wherein forwarding the incast notification packet to a destination server comprises placing the incast notification packet at the head of an output buffer queue in the network switch to forward the incast notification packet to the destination server.

11. The method of claim 5, wherein notifying the sender server that one or more packets have been dropped comprises using a TCP option field.

12. A non-transitory computer readable medium, having instructions stored thereon executable by a processor to:

select a buffer from a plurality of buffers in a network switch, wherein to select a buffer comprises to probabilistic select the buffer based on a current occupancy of the plurality of buffers and an arrival of an incoming network packet, wherein the buffer selected from the plurality of buffers comprises a currently used buffer, the currently used buffer storing a network packet that is selected to be dropped by the network switch;

drop the network packet;

convert the buffer to store an incast notification packet indicating the dropped network packet; and forward the incast notification packet with an incast notification packet specific header to a destination server to inform the destination server that the network packet was dropped.

13. The non-transitory computer readable medium of claim 12, further comprising to drop the incoming network packet.

14. The non-transitory computer readable medium of claim 13, wherein the incast notification packet comprises one or more packet headers for the dropped network packet and the incoming network packet.

15. The non-transitory computer readable medium of claim 12, wherein the network switch and the destination server comprise an incast notification packet protocol to receive the incast notification packet from the network switch.

16. The non-transitory computer readable medium of claim 12, wherein the plurality of buffers comprises a plurality of reserved incast notification packet buffers.

* * * * *